United States Patent [19]
Patel et al.

[11] Patent Number: 5,910,543
[45] Date of Patent: *Jun. 8, 1999

[54] THERMOPLASTIC ELASTOMER WITH POLAR AND NON-POLAR RUBBER COMPONENTS

[75] Inventors: Raman Patel; Sabet Abdou-Sabet, both of Akron, Ohio; Hsien-Chang Wang, Bellaire, Tex.

[73] Assignees: Advanced Elastomer Systems, L.P., Akron, Ohio; Exxon Chemical Patents Inc, Baytown, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/768,543

[22] Filed: Dec. 18, 1996

[51] Int. Cl.$^6$ .............................. C08L 71/10; C08L 67/00; C08L 77/00
[52] U.S. Cl. .......................... 525/166; 525/179; 525/183; 525/185; 525/391
[58] Field of Search ..................................... 525/166, 171, 525/179, 183, 184, 185, 391, 392, 426

[56] References Cited

U.S. PATENT DOCUMENTS

| | | |
|---|---|---|
| 4,311,628 | 1/1982 | Abdou-Sabet et al. . |
| 4,409,365 | 10/1983 | Coran et al. ............................... 525/78 |
| 5,073,597 | 12/1991 | Puydak et al. ........................... 525/193 |
| 5,143,981 | 9/1992 | Abe .......................................... 525/391 |
| 5,177,147 | 1/1993 | Spenadel ................................... 525/88 |
| 5,189,103 | 2/1993 | Abe .......................................... 525/391 |
| 5,254,626 | 10/1993 | Penco ....................................... 525/166 |
| 5,403,888 | 4/1995 | Nishio ....................................... 525/64 |

FOREIGN PATENT DOCUMENTS

| | | |
|---|---|---|
| 2091633 | 9/1993 | Canada . |
| 0 050 471 A1 | 4/1982 | European Pat. Off. . |
| 0 468 947 A2 | 1/1992 | European Pat. Off. . |

OTHER PUBLICATIONS

"The Chemistry of Phenol–Formaldehyde Resin Vulcanization of EPDM" M. Van Duin et al, *Rubber Chemistry and Technology* vol. 68, pp. 717–727, 1995.

*Primary Examiner*—Christopher Henderson
*Attorney, Agent, or Firm*—Daniel J. Hudak; William A. Skinner

[57] ABSTRACT

Thermoplastic elastomer compositions which have good high temperature end use and good oil swell resistance are made by blending a high melting thermoplastic polymer containing a non-polar rubber and a polar rubber. Alternatively, a high melting thermoplastic polymer containing a non-polar rubber or a polar rubber or both is blended with a polyolefin thermoplastic polymer containing a non-polar rubber, or a polar rubber, or both. The composition is dynamically vulcanized. The cured multi-component thermoplastic elastomer compositions exhibit good end use properties such as hardness, tensile strength, modulus, flexibility.

3 Claims, No Drawings

THERMOPLASTIC ELASTOMER WITH POLAR AND NON-POLAR RUBBER COMPONENTS

FIELD OF THE INVENTION

The present invention relates to generally high melting thermoplastic polymer (engineering resin) based compositions such as polyamide or polyester which have high end use temperatures, especially in hot oil, and good resistance to swelling in oil.

BACKGROUND OF THE INVENTION

Heretofore, polyolefins such as polyethylene and polypropylene when utilized as a plastic component in thermoplastic elastomers had an upper end use temperature of less than 150° C. Accordingly, these compositions had limited end use applications as in under the hood applications of a vehicle where high temperatures are encountered and where low oil swell is desirable.

U.S. Pat. No. 4,409,365, to Coran and Patel relate to thermoplastic rubber blends which have good oil resistance and comprise monoolefin rubber and nitrile rubber.

U.S. Pat. No. 5,073,597, to Puydak, Hazelton and Ouhadi relate to dynamically vulcanized compositions having good tensile strength and include a first butyl or halobutyl rubber-based elastomer and a second EPM and/or EPDM elastomer in a matrix of a crystalline polyolefin resin.

SUMMARY OF THE INVENTION

Dynamically vulcanized, high melting multi-component thermoplastic elastomer compositions contain blends of polyolefin thermoplastic polymers such as those made from $C_2$ to $C_8$ monomers, e.g., polyethylene or polypropylene, and high melting thermoplastic polymers, for example, engineering resins such as polyesters or certain polyamides, with either non-polar rubber or polar rubber therein, or combinations thereof. A preferred thermoplastic elastomer composition contains one or more high melting thermoplastic polymers with one or more polar rubbers and one or more non-polar rubbers therein.

The thermoplastic elastomer compositions can be formulated by various methods as by dynamically vulcanizing a blend of a rubber and a polyolefin thermoplastic polymer, dynamically vulcanizing a blend of a rubber and a high melting thermoplastic polymer, and subsequently blending the two blends together. Alternatively, the two different thermoplastic polymers can be blended and the rubber added thereto and dynamically vulcanized. Regardless of blending procedure, the amount of the rubber, for example, polar and/or non-polar, within the polymer blend can vary over a wide range as can the amount of the polyolefin thermoplastic polymer and the high melting polymer with respect to one another. Still another formulation method is to blend a non-polar rubber and a polar rubber with one or more high melting thermoplastic polymers and dynamically vulcanize the rubbers. Conventional vulcanizing agents and accelerators are typically utilized to promote cure during dynamic vulcanization in which a high degree of cure, for example, at least 90 percent, is readily obtained. Moreover, the thermoplastic elastomer compositions of the present invention can contain typical and conventional additives therein such as plasticizers, fillers, process oils, and the like. The dynamically vulcanized thermoplastic elastomer compositions of the present invention exhibit low oil swell and high melting points.

DETAILED DESCRIPTION OF THE INVENTION

Dynamically cured multi-component thermoplastic elastomer compositions generally comprise at least one high melting thermoplastic polymer or engineering resin and optionally at least one polyolefin thermoplastic polymer. High melting polymers are those which have a melting point of at least 150° C., desirably at least 175° C., and preferably at least 200° C. and thus do not generally include polyolefin thermoplastic polymers. Such high melting polymers include various engineering resins, e.g., polyamides, polyesters, polyphenylene oxide, copolymers thereof, and the like, with the polyamides and polyesters being preferred.

Suitable thermoplastic polyamide polymers include thermoplastic crystalline or amorphous high molecular weight solid polymers such as homopolymers, copolymers and terpolymers having recurring amide units within the polymer chain. Both fiber forming and molding grade nylons are suitable polyamide resins. Commercially available nylons may be advantageously used in the practice of this invention. Examples of suitable polyamides are polylactams such as NYLON 6, polypropiolactam (NYLON 3), polyenantholactam (NYLON 7), polycapryllactam (NYLON 8), polylaurylactam (NYLON 12), and the like; homopolymers of amino acids such as polyaminoundecanoic acid (NYLON 11); polypyrrolidinone (NYLON 4); copolyamides of dicarboxylic acid and diamine such as NYLON 6,6, polytetramethyleneadipamide (NYLON 4,6), polytetramethyleneoxalamide (NYLON 4,2), polyhexamethyleneazelamide (NYLON 6,9), polyhexamethylenesebacamide (NYLON 6,10), polyhexamethyleneisophthalamide (NYLON 6,10), polyhexamethylenedodecanoic acid (NYLON 6,12) and the like; aromatic and partially aromatic polyamides; copolyamides such as of caprolactam and hexamethyleneadipamide (NYLON 6/6,6), or a terpolyamide, e.g., NYLON 6/6,6/6, 10; block copolymers such as polyether polyamides; or mixtures thereof. Additional examples of suitable polyamides are described in the Encyclopedia of Polymer Science and Technology, Second Edition, Vol. 11, pages 315–476, incorporated herein by reference. Preferred polyamides employed in this invention are NYLON 6, NYLON 11, NYLON 12, NYLON 6,6, NYLON 6,9, NYLON 6,10, and NYLON 6/66. A very highly preferred nylon is Nylon 6. The polyamides generally have a number average molecular weight of from about 10,000 to about 100,000, and desirably from about 30,000 to about 50,000.

The polyester polymers include polyester homopolymers, polyester copolymers, a polyester block copolymer, or a polycarbonate, etc., and mixtures thereof. The various polyesters can be either aromatic or aliphatic or combinations thereof and are generally directly or indirectly derived from the reactions of diols such as glycols having a total of from 2 to 12 carbon atoms and desirably from about 2 to about 4 carbon atoms with aliphatic diacids having a total of from 2 to 20 carbon atoms and desirably from about 3 to about 15 carbon atoms or from aromatic diacids having a total of from about 8 to about 15 carbon atoms. Generally, aromatic polyesters are preferred such as polyethyleneterephthalate (PET), polybutyleneterephthalate (PBT), polyethyleneisophthalate, polynaphthalenephthalate, and the like. A highly preferred polyester is polybutyleneterephthalate. Various polycarbonates can also be utilized and the same are esters of carbonic acid. A suitable polycarbonate is based on bisphenol A, i.e., poly(carbonyldioxy1,4-phenyleneisopropylidene-1,4-phenylene). The various ester polymers also include block polyesters such as those containing at least one block of a polyester and at least one rubbery block such as a polyether derived from glycols having from 2 to 6 carbon atoms, e.g., polyethylene glycol, or from alkylene oxides having from 2 to 6 carbon atoms. A preferred block co-polyester is polybutyleneterephthalate-polyethylene glycol which is available as Hytrel from DuPont.

The polyphenylene oxides can be derived from various commercial sources and generally have a molecular weight such that they also have a melting point or glass transition temperature of at least 150° C., desirably at least 175° C., and preferably at least 200° C.

The amount of the one or more high melting thermoplastic polymers, e.g., nylon and/or polyester, is generally from about 5% to about 95%, desirably from about 30% to about 70%, and preferably from about 40% to about 60% by weight based upon the total weight of the one or more high melting thermoplastic polymers and the total amount by weight of the one or more polyolefin thermoplastic polymers.

The one or more polyolefin thermoplastic polymers are made or derived from a-olefin monomers having from 2 to 8 carbon atoms. Such polymers are desirably crystalline, high molecular weight solid polymers made in accordance with conventional processes. Moreover, such polymers are generally isotactic and syndiotactic resins. Examples of suitable polyolefin thermoplastic polymers include polyethylene, polypropylene, poly(1-butene), poly(1-pentene), poly(1-hexene), poly(2-methyl-1-propene), poly (3-methyl-1-pentene), poly(4-methyl-1-pentene), poly(5-methyl-1-hexene), and mixtures thereof, with polypropylene being preferred.

The amount of the one or more polyolefin thermoplastic polymers utilized in the thermoplastic elastomer compositions of the present invention is from about 5 to about 95 percent, desirably from about 30 to about 70 percent, and preferably from about 40 to about 60 percent by weight based upon the total weight of said one or more polyolefin thermoplastic polymers and the one or more high melting thermoplastic polymers.

The non-polar rubbers of the present invention are generally EPDM type rubbers, butyl rubbers, halogenated butyl rubbers, and copolymers of isobutylene and alkyl styrene having a total of from 9 to 20 carbon atoms as well as halogenated copolymers thereof. "Non-polar"halobutyl rubber will have generally about 8 percent or less, desirably about 5 percent or less, and preferably about 3 percent or less halogen by weight in the rubber.

The EPDM type rubbers are terpolymers derived from the polymerization of at least two monoolefin monomers having from 2 to 10 carbon atoms, preferably 2 to 4 carbon atoms, and at least one nonconjugated polyunsaturated olefin of from 5 to 20 carbon atoms. Said monoolefins desirably have the formula $CH_2=CH-R$ where R is an H or an alkyl of 1-8 carbon atoms and are preferably ethylene and propylene. Desirably, the ethylene and propylene are present in a weight ratio of 50:50 to 75:25 (ethylene/propylene) and constitute from about 90 to about 98 wt. % of the polymer. The nonconjugated polyunsaturated olefin can be a straight chained, branched, cyclic, bridged ring, bicyclic, fused ring, bicyclic, etc. Preferably, it is a nonconjugated diene. Desirably, the amount of the nonconjugated diene is from about 2% to about 10 wt. % of the rubber.

Butyl rubber is a polymer predominantly comprised of repeat units from isobutylene but including a few repeat units of a conjugated diene which provides sites for crosslinking. Desirably from about 90 wt. % to about 99.5 wt. % of the butyl rubber is repeat units derived from the polymerization of isobutylene and from about 0.5 wt. % to about 10 wt. % of the repeat units are derived from a conjugated diene having from 4 to 8 carbon atoms such as butadiene, isoprene, hexadiene, etc., with isoprene being preferred. The polymer can be halogenated to further enhance reactivity in crosslinking. Preferably, the halogen is present in amounts from about 0.1 to about 8 percent by weight, and more preferably from about 0.5 to about 3.0 percent by weight based upon the total weight of the halogenated butyl rubber. Preferably, the halogen is chlorine or bromine.

Another suitable and generally highly desirable rubber are copolymers of isobutylene and alkylstyrene wherein from about 85 wt. % to about 99.5 wt. % and preferably from about 88 or 90 wt. % to about 98 wt. % of the polymer is repeat units derived from isobutylene and from about 0.5 wt. % to about 15 wt. %, more preferably from about 2 wt. % to about 10 or 12 wt. % of the polymer is repeat units derived from alkylstyrene. Preferably the alkyl group has from 1 to 4 carbon atoms such as methylstyrene, and preferably is para-methylstyrene. Desirably, the polymer is halogenated so that it contains from about 0.1 to about 5 percent by weight and desirably from about 0.5 to about 2.0 percent by weight of the halogen based upon the total weight of the halogenated copolymer. Preferably, the halogen is bromine. Desirably, this polymer has a Mooney ML (1+4) at 100° C. viscosity from about 30 to about 50. Such polymers are described in U.S. Pat. No. 5,162,445, hereby fully incorporated by reference, and are available from Exxon Chemical as Exxpro rubber.

Preferred non-polar rubbers include the halogenated copolymers of isobutylene and alkylstyrene.

The one or more polar rubbers include acrylic rubbers, nitrile rubber, hydrogenated nitrile rubber, ethylene-acrylate terpolymers wherein the termonomer provides a cure site for the rubber, and the like. The various nitrile rubbers are preferred. By the term "polar rubber," it is meant that the rubber contains atoms other than hydrogen or carbon such as nitrogen or oxygen as in nitrile rubber, acrylic rubber, or copolymers of acrylic rubber.

The acrylic rubbers are alkyl acrylates wherein the alkyl portion has from 1 to 10 carbon atoms, with from 1 to 4 carbon atoms being preferred. Specific examples include polymers of methyl acrylate, ethyl acrylate, butyl acrylate, ethyl-hexyl acrylate, and the like.

Other suitable acrylic rubbers include copolymers of ethylene and the above noted alkyl acrylates wherein the amount of ethylene is desirably high, e.g., from about 10 to about 90 mole percent, desirably from about 30 to about 70 mole percent, and preferably from about 40 to about 60 mole percent of ethylene repeat groups based upon the total number of moles of ethylene and acrylate repeat groups in the copolymer.

Other acrylate copolymers include terpolymers of ethylene-acrylate-carboxylic acids, wherein the unsaturated acids have from 2 to 15 carbon atoms and desirably from 2 to 10 carbon atoms. Such ethyleneacrylate-carboxylic acid terpolymer rubbers are available from DuPont. More specifically, such terpolymers generally contain from about 35 to about 80 mole percent and desirably from about 45 to about 55 mole percent of ethylene repeat groups, generally from about 0.5 to about 10 mole percent and desirably from about 2 to about 8 mole percent of acid repeat groups, and generally from about 10 to about 60 mole percent and desirably from about 37 to about 50 mole percent of alkyl acrylate repeat groups based upon the total number of repeat groups in the terpolymer. The repeat groups generally have acid functionality. A specific commercially available compound is Vamac G, manufactured by DuPont, which generally has about 50 mole percent ethylene, about 45 mole percent of methyl acrylate, and about 5 mole percent of acid functionality.

The nitrile rubbers are copolymers of acrylonitrile with a conjugated diene having from 4 to 8 carbon atoms, with butadiene being highly preferred. The nitrile rubbers of acrylonitrile repeat units in these copolymers can vary widely, such as from about 10 to about 60 percent, and preferably from about 20 to about 35 percent by weight. Such polymers are well known to the art and inherently have good oil resistance.

The amount by weight of the one or more non-polar rubbers, or polar rubbers, or combinations thereof, is generally from about 10% to about 90% by weight, desirably from about 25% to about 80% by weight, and preferably from about 40% to about 70% by weight based upon the total weight of the one or more rubbers and the one or more thermoplastic polymers (high melting and polyolefins) in the blend or in the final multi-component thermoplastic elastomer composition. When a polar rubber and a non-polar rubber are both utilized within the multiple component thermoplastic elastomer composition of the present invention, the amount of the non-polar rubber is from about 25 percent to about 75 percent by weight and desirably from about 40 percent to about 60 percent by weight based upon the total weight of the non-polar rubber and the polar rubber. Hence, the amount of the polar rubber is from about 75 to about 25 percent by weight and desirably from about 60 percent to about 40 percent by weight.

Many combinations of one or more rubbers, for example, non-polar, polar, or both within a first blend such as one or more high melting thermoplastic polymers, and within a second blend such as one or more polyolefin thermoplastic polymers, are thus possible. Moreover, the non-polar rubber, or the polar rubber, or both, can be added to an already blended mixture containing one or more high melting thermoplastic polymers and one or more polyolefin thermoplastic polymers. Still another multiple component thermoplastic elastomer composition of the present invention can be made by adding a polar rubber as well as a non-polar rubber to one or more high melting thermoplastic polymers. This embodiment of one or more high melting thermoplastic polymers containing both a polar and a non-polar rubber is preferred because of the overall high melting temperature of the composition. Still another multi-component thermoplastic elastomer composition is that which contains one or more polyolefins with a polar rubber as well as a non-polar rubber such as copolymer of isobutylene and an alkyl styrene. This thermoplastic elastomer composition generally has the lowest overall melting point.

Regardless of the various blends or preblends of the present invention, the rubber component can be cured, preferably by dynamic vulcanization, at any step of preparation during the preparation of the final multiple component thermoplastic elastomer composition. For example, when two blends are separately made, e.g., one containing a high melting point thermoplastic polymer and the other one a polyolefin thermoplastic polymer, each blend can be dynamically vulcanized separately and then subsequently blended together. Alternatively, these two different blends can be blended together and then the rubber therein dynamically vulcanized. It should thus be apparent that the present invention is not only applicable with regard to forming a large number of different thermoplastic-rubber preblends or final blends, but that the curing of the rubber therein can generally occur at any stage. A highly preferred final blend is a cured non-polar rubber such as a halogenated copolymer of isobutylene and methyl styrene and a cured polar rubber with one or more high melting thermoplastic polymers such as nylon or polyester.

Conventional curing or vulcanizing agents appropriate for the rubber can be utilized to cure the polar and/or non-polar rubbers of the present invention. Examples include sulfur and sulfur vulcanizing agents; various organic peroxides such as benzoyl peroxide, dicumyl peroxide, 2,5 dimethyl-2,5 di (tertbutylperoxy) hexane, and 2,2'-bis (tertbutylperoxy) diisopropyl benzene; hydrosilation curing agents; metal oxides such as zinc oxide or magnesium oxide; co-curing agents such as various maleimides; and the like; all as set forth in U.S. Pat. No. 5,073,597, hereby fully incorporated by reference. Moreover, various phenolic resins known to the art and to the literature can be utilized, as well as various phenol-formaldehyde resins as set forth in "The Chemistry of Phenol-Formaldehyde Resin Vulcanization of EPDM: Part I. Evidence for Methylene Crosslinks," by Martin Van Duin and Aniko Souphanthong, Rubber Chemistry and Technology, vol. 68, pp 717–727, 1995, hereby fully incorporated by reference.

It has also been found that certain hindered amines which generally can be utilized as polymeric light stabilizers unexpectedly function as a curing agent for halobutyl rubbers. Such a class of curatives include Chimassorb 944LD, which has the Chemical Abstract service name of N,N'bis (2,2,6,6-Tetramethyl-4-piperidinyl)-1,6-hexane-diamine, polymer with 2,4,6-trichloro 1,3,5-triazine and 2,4,4-trimethyl-1,2-pentamine.

The amount of the curing agent will generally vary depending upon the type utilized and especially the desired degree of cure, as is well recognized in the art. For example, the amount of sulfur is generally from about 1 to 5, and preferably from about 2 to about 3 parts by weight per 100 parts by weight of the rubber. The amount of the peroxide curing agent is generally from about 0.1 to about 2.0 parts by weight, the amount of the phenolic curing resin is generally from about 2 to about 10 parts by weight, and the amount of the hindered amine is from about 0.1 to about 2 parts by weight, all based upon 100 parts by weight of the polar or non-polar rubber.

Whenever a halogenated butyl rubber is utilized or any halogenated rubber, small amounts of an alkaline earth oxide compound such as magnesium oxide is utilized in an amount of about 3 parts by weight or less, and desirably about 2 parts by weight or less for every 100 parts by weight of the halogenated rubber to act as a scavenger of hydrogen halides. Conventional catalysts (accelerators) can also be utilized such as those known to the art and to the literature. For example, suitable amounts of various Freidel Crafts catalysts can be utilized such as stannous chloride, salicylic acid, para-toluene sulfonic acid, zinc chloride, and the like.

The amount of the curative and accelerators are such that a degree of cure, that is, at least 90%, desirably at least 95 or 96%, preferably at least 97% or 98% of the curable rubber is nonextractable in a suitable solvent for the particular rubber at 23° C. Suitable solvents include xylene, cyclohexane, acetone, hexane, toluene, and the like.

The various blends or compositions of the present invention can contain various additives in conventional or suitable amounts. For example, various reinforcing agents or fillers such as clay, silica, talc, zinc oxide, and the like can be utilized. Moreover, various colorants or pigments such as titanium dioxide, carbon black, etc. can also be used. Other additives include various antioxidants, various ultraviolet light stabilizers such as various hindered amines, various stabilizers, various processing oils, various lubricants, for example, oleamide, various anti-static agents, various waxes, various flame retardants, various plasticizers, and various other additives known to the art.

As noted above, the various blends of the present invention are dynamically vulcanized. Dynamic vulcanization means vulcanizing the polar and/or non-polar rubber of the composition of the present invention under shear at cure temperatures under molten conditions for the blend which include temperatures above the melting point of the thermoplastic. As a result, the rubber is generally crosslinked while being blended with the one or more thermoplastic polymers. The rubber can thus be simultaneously crosslinked and dispersed as fine particles of a "microgel" within the thermoplastic, e.g., polyester, matrix. Sources of high shear include Brabender mixers, Banbury mixers, extruders including twin screw extruders, and the like.

A unique characteristic of the composition of the present invention is that while the elastomer rubber portion is crosslinked, the compositions nevertheless can be processed and reprocessed by conventional thermoplastic processing techniques and equipment such as extrusion, injection molding, compression molding and the like. An advantage of the thermoplastic elastomers of the present invention is that flashing, scrap, etc., can be salvaged and reprocessed.

Dynamic vulcanization generally involves adding the one or more polar and/or non-polar rubber, the various thermoplastics, the various accelerators, etc., to a mixing device such as a Brabender and heating the composition to a temperature above the melting point of the thermoplastic and mixing. The mixing temperature is generally from about 180° C. to about 260° C., and desirably from about 200° C. to about 230° C. After addition of the curative, the composition is mixed until the torque curve levels off at which time the composition is mixed for an additional short period of time, for example, about 2 minutes. After mixing and curing, the thermoplastic elastomer compositions were removed from the Brabender mixer, returned to the mixer and remixed, then removed again and cold pressed into a pancake and subsequently compression molded into plaques for testing.

The multiple component thermoplastic elastomer compositions of the present invention have various desirable properties including good high temperature resistance, e.g., low oil swell, such as values of about 55 or 50 or less, desirably about 45 or less, and preferably about 40, 35, or 30 or less at 150° C. for 70 hours. The thermoplastic elastomer compositions desirably have high melting points, especially compositions which contain only at least one high melting thermoplastic polymer or such compositions which additionally contain low amounts of a polyolefin, for example, about 20 percent or less by weight and preferably about 10 percent or less by weight based upon the total weight of all of the thermoplastic polymers. Such melting points are at least 150° C., at least 175° C., and preferably at least 200° C. These properties render the thermoplastic elastomer compositions of the present invention suitable for many high temperature uses for a vehicle, such as seals, tubings, hoses, gaskets, diaphragms, and the like, especially for under the hood applications where heat and oil are often encountered.

The invention will be better understood by reference to the following examples which serve to illustrate, but not to limit the scope of the present invention.

EXAMPLES

Examples 1 through 8

The two rubbers set forth in Table I were first blended together in a Brabender at 70 rpm and 160° C. to a consistent viscosity and mixed for 3 minutes, Zinc oxide and zinc stearate were then added and the rpm increased to control the temperature at 180° C. Mixing was continued for 3 minutes after a peak was reached. Samples were then removed from the Brabender and pressed into a cold press for subsequent preparation.

To prepare the thermoplastic vulcanizates (TPV), the rubber blend was mixed at 100 rpm and 180° C. for compositions containing polyolefin only. For compositions containing engineering resins, e.g., Nylon 6, PBT, the mixing was done at 220°–240° C. After initial melt, the mixture was mixed for an additional 3 minutes, then the curatives were added. One minute later, additional zinc oxide and zinc stearate was added. Mixing continued for 3 minutes from the cure peak. In some examples, other ingredients are added, as set forth in the tables at this time, and mixing continued for 2 more minutes. The mixture was removed from the Brabender, and returned to the mixer for an additional 1 minute of mixing. The mixture was then cold pressed and compression molded at 200° C. for the composition containing only polypropylene as the plastic matrix and 250° C. to 260° C. for the compositions containing polyamides or polyesters.

The recipes of examples 1–8 as well as physical data thereof are set forth in Table I. Examples 1, 2, 3, and 5 show products made from a mixture of non-polar and polar rubber with either polyolefin or an engineering thermoplastic resin. Examples 4, 6, 7 and 8 show products made from similar mixture of rubbers and a mixture of polyolefin and engineering resins. The oil swell (percent change in weight) was determined in accordance with ASTM D-471 by submerging the specimen in ASTM 3 oil for the time and temperature indicated.

TABLE I

| MASTER BATCH: | 1 | 2 | 3 | 4 | 5 | 6 | 7 | 8 |
|---|---|---|---|---|---|---|---|---|
| Bromobutyl rubber | 50 | — | — | — | — | — | — | — |
| Exxpro rubber | — | 50 | 50 | 50 | 50 | 50 | 50 | 50 |
| NBR | — | — | — | — | — | — | — | 50 |
| HNBR (hydrogenated) | 50 | 50 | 50 | 50 | 50 | 50 | 50 | — |
| Zinc oxide/Zinc stearate | 0.5/0.5 | 0.5/0.5 | 0.5/0.5 | 0.5/0.5 | 0.5/0.5 | 0.5/0.5 | 0.5/0.5 | 0.5/0.5 |
| Polypropylene | 67 | 67 | — | 33 | — | 33 | — | 33 |
| Nylon 6 | — | — | — | — | — | — | 33 | 33 |
| PBT | — | — | — | — | 67 | 33 | — | — |
| Nylon 12 | — | — | 67 | 33 | — | — | 33 | — |

TABLE I-continued

| MASTER BATCH: | 1 | 2 | 3 | 4 | 5 | 6 | 7 | 8 |
|---|---|---|---|---|---|---|---|---|
| SP-1045 (phenolic resin) | 8 | 8 | 4 | 8 | 8 | 8 | 4 | 8 |
| ZnO/ZnSt | 0.5/0.5 | 0.5/0.5 | 0.5/0.5 | 0.5/0.5 | 0.5/0.5 | 0.5/0.5 | 0.5/0.5 | 0.5/0.5 |
| MgO | 1 | — | 1 | 1 | — | — | 1 | — |
| Hardness, Shore D | 42 | 41 | 41 | 33 | 41 | 40 | 38 | 37 |
| Tensile Strength, psi | 1970 | 2660 | 2050 | 2120 | 1830 | 1460 | 2360 | 2080 |
| $M_{100}$, psi | — | 1420 | 1420 | 1400 | — | 1250 | 1780 | 1500 |
| Ultimate Elongation, (UE), % | 250 | 360 | 260 | 260 | 120 | 160 | 200 | 210 |
| Tension Set, % | 35 | 27 | 65 | 36 | 23 | 22 | 56 | — |
| Oil Swell, 70 hr @ 125° C., % | — | 74 | 38 | 70 | 41 | 49 | 40 | 61 |
| Oil Swell, 70 hr @ 150° C., % | — | — | 51 | 118 | 45 | 66 | 56 | 86 |

TABLE II

| MASTER BATCH: | 9 | 10 | 11 | 12 | 13 | 14 | 15 | 16 |
|---|---|---|---|---|---|---|---|---|
| Exxpro rubber | 50 | 50 | 50 | 50 | 50 | 50 | 50 | 50 |
| NBR, Kynac 38.50 | 50 | 50 | 50 | 50 | 50 | 50 | — | — |
| HNBR | 0 | 0 | 0 | 0 | 0 | 0 | 50 | 50 |
| Zinc oxide/Zinc stearate | 0.5/0.5 | 0.5/0.5 | 0.5/0.5 | .34/.34 | .17/.17 | — | — | — |
| Nylon 6 | 67 | 67 | 67 | 67 | 67 | 67 | — | — |
| Nylon 12 | — | — | — | — | — | — | 67 | — |
| PBT | — | — | — | — | — | — | — | 67 |
| Chimassorb 9446LD | — | — | 0.5 | 0.5 | 0.5 | 0.5 | — | — |
| SP-1045 | 8 | 4 | 4 | 4 | 4 | 4 | 4 | 8 |
| Zinc oxide/Zinc Stearate | 1/1 | 0.5/0.5 | 0.2/0.2 | 0.2/0.2 | 0.2/0.2 | 0.2/0.2 | 1/1 | 1/1 |
| MgO | 1 | 1 | 1 | 1 | 1 | 1 | 1 | — |
| Magnesium Stearate | — | — | 0.3 | 0.3 | 0.3 | 0.3 | — | — |
| Shore D Hardness | 51 | 50 | 48 | 47 | 49 | 48 | 41 | 41 |
| Tensile strength | 2770 | 1600 | 2920 | 3010 | 3080 | 2540 | 2050 | 1830 |
| $M_{100}$, psi | 2770 | — | 2790 | 2370 | 2470 | 2390 | 1420 | — |
| Ultimate Elongation, % | 100 | 40 | 230 | 220 | 170 | 130 | 260 | 120 |
| Tension Set, % | — | — | 58 | 60 | 60 | F | 65 | 23 |
| Oil Swell, 70 hr @ 125° C., % | 17 | 26 | 28 | 26 | 25 | 27 | 38 | 41 |
| Oil Swell, 70 Hr @ 150° C., % | 25 | 29 | 32 | 30 | 29 | 29 | 51 | 45 |

Examples 9 through 16

The mixing procedure for examples 9–16 was identical to that for examples 1–8. Examples 10–15 were mixed differently since the curatives were changed. First the rubber blend was mixed as described above. To prepare the TPV, the rubber blend was mixed at 100 rpm and 220° C. After the initial melt, the mixture was mixed for an additional 3 minutes, then the phenolic resin was added followed by an additional amount of zinc oxide and zinc stearate followed by the addition of Chimassorb 944LD, i.e., poly{6-[1,1,3,3,-tetramethyl butyl)amino]-S-triazine-2,4-diyl}{](2,2,6,6-tetramethyl-4-piperidyl) iminol]hexamethylene[(2,2,6,6-tetramethyl-4-piperidyl) iminol]}.

Mixing was continued for 3 minutes from the cure peak, then as indicated, magnesium stearate was added and mixing continued for 2 more minutes. The mixture was removed from the Brabender, cold pressed and returned to the mixer for an additional 1 minute. The mixture was then cold pressed and compression molded at 250 to 260° C.

Examples 9–16 utilized a mixture of rubbers with an engineering thermoplastic resin.

As apparent from Table II, good physical properties were obtained with very low oil swell values when a combination of a halogenated copolymer of isobutylene and alkylstyrene (Exxpro rubber) and nitrile rubber were utilized.

TABLE III

| SAMPLE | 17 | 18 | 19 |
|---|---|---|---|
| Exxpro rubber | 30 | 30 | 30 |
| $N_6$, PA | 20 | 20 | 20 |
| Acrylic Rubber | 30 | — | — |
| $N_6$, PA | 20 | 20 | 20 |
| Vamac G | — | 30 | 30 |
| Uniplex 214* | — | — | 10 |
| Diak - 1** | 0.25 | 0.25 | 0.25 |
| Zinc Oxide | 0.5 | 0.5 | 0.5 |
| MgO | 0.6 | 0.6 | 0.6 |
| MD 1024*** | 0.8 | 0.8 | 0.8 |
| Potassium Iodide | 0.2 | 0.2 | 0.2 |
| Shore D hardness | 51 | 48 | 35 |
| UTS, psi | 3540 | 3260 | 2670 |
| M100, psi | 2800 | 2680 | 2060 |
| UE, % | 190 | 170 | 190 |
| Oil Swell 70 hrs @ 150° C., % | 25 | 43 | 36 |
| Compression Set, 22 hrs @ 150° C., % | 54 | 67 | — |

*Uniplex 214 - N-butylbenzene sulfonamide
**Diak No. 1 - Hexamethylene diamine carbamate
***Irganox MD1024 N'N'-bis[3',5'di-tert-butyl-4-hydroxy-phenyl) propanyl-hydrazine Examples 17, 18, and 19

The individual rubbers were initially mixed in polyamide to make a masterbatch in a Brabender at 80 rpm and 220° C. until the torque has levelled off and then mixed for 2 more minutes. The blend was taken out of the Brabender and cold pressed. To prepare the TPVs from the simple blends, the different blends were mixed together at 80 rpm and 220° C. for 5 minutes, then curative was added 5 minutes from the initial mix time with DIAK-1 and zinc oxide; the stabilizer, i.e., MgO, MD-1024 and K iodide were added when the torque reached maximum. The Uniplex plasticizer is added at the melt.

Good physical properties were obtained with low oil swell values in examples 17-19 wherein only high melting point thermoplastics were utilized.

While in accordance with the Patent Statutes, the best mode and preferred embodiment has been set forth, the scope of the invention is not limited thereto, but rather by the scope of the attached claims.

What is claimed is:

1. A thermoplastic elastomer composition consisting essentially of
    (A) from about 40 to about 70 percent by weight of the total composition of a blend of
        (a) from about 25 to about 75 percent by weight of the total of (a)+(b) of a polar rubber selected from the group consisting of acrylic rubber, nitrile rubber, hydrogenated nitrile rubber, a copolymer of an acrylate and ethylene, a terpolymer of ethylene, acrylate and carboxylic acid, or combinations thereof, and
        (b) from about 75 to about 25 percent by weight of the total of (a)+(b) of a nonpolar rubber selected from the group consisting of butyl rubber, halogenated butyl rubber, EPDM rubber, a copolymer of isobutylene and $C_{1-4}$ alkyl styrene, or combinations thereof, wherein (a) and (b) are dynamically cured to a degree such that at least about 90 percent of the curable rubber is not extractable in a rubber solvent, with
    (B) from about 30 to about 60 percent by weight of the total composition of a high melting thermoplastic polymer selected from the group consisting of nylon, polyester, polyphenylene oxide, or copolymers thereof.

2. The composition of claim 1 wherein polar rubber (a) is a nitrile rubber, nonpolar rubber (b) is a copolymer of isobutylene and $C_{1-4}$ alkyl styrene, and thermoplastic polymer (B) is nylon.

3. The composition of claim 1 wherein the melting point of thermoplastic polymer (B) is at least 200° C.

* * * * *